Oct. 13, 1936.    G. HARMS    2,057,571
BELT GUIDE
Filed Nov. 12, 1935
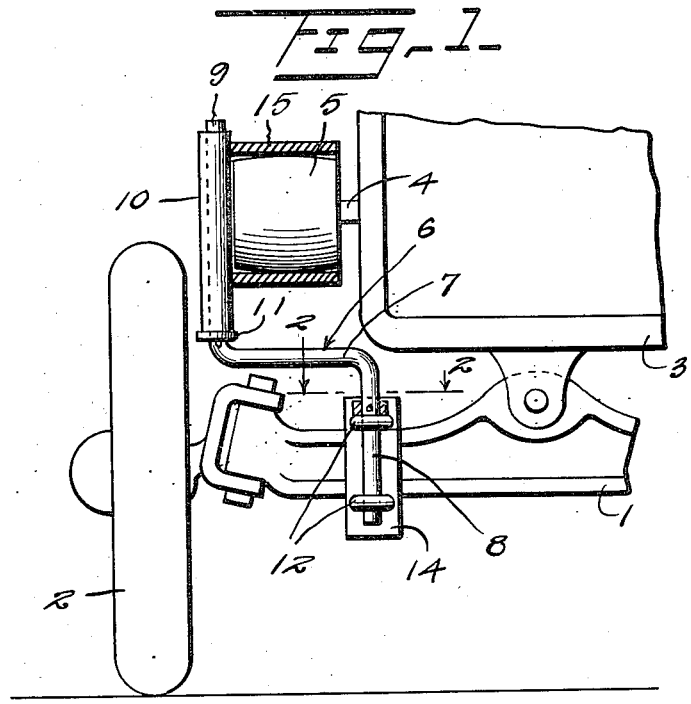
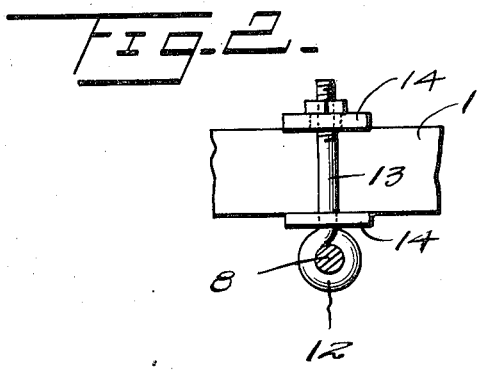
Inventor
Gunther Harms
By Watson E. Coleman
Attorney Patented Oct. 13, 1936

2,057,571

UNITED STATES PATENT OFFICE 2,057,571

BELT GUIDE

Gunther Harms, Keene, N. Dak.

Application November 12, 1935, Serial No. 49,382

1 Claim. (Cl. 74—240)

This invention relates to an attachment for a tractor and pertains particularly to a belt guiding device.

The primary object of the present invention is to provide a guide element applied to a tractor of the type having a power take-off belt pulley whereby the belt leading from the pulley will be prevented from coming into contact with adjacent portions of the tractor structure, particularly the wheel of the tractor.

In the majority of tractors the power take-off device includes a belt pulley which is disposed at one side of the tractor body and which is at such an elevation that a belt leading therefrom forwardly must pass between the body of the tractor and the front wheel and an edge of the belt frequently comes against the tractor wheel, with resultant damage to the belt if the wheel is of steel construction, and with damage to the wheel structure if it is of the type having a pneumatic tire thereon. The present device is designed to prevent this contact between the wheel and the belt.

Another object of the invention is to provide a device for accomplishing the above described results, which is of simple construction and which may be easily and quickly applied to the front axle of the tractor without having to drill the axle or make any changes therein.

A further object of the invention is to provide a belt guide of the above described character which is readily adjustable and which is yieldable to a certain degree to variations in the pressure with which the belt may contact it.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claim.

In the drawing:

Figure 1 is a view in front elevation of a portion of a tractor showing the device embodying the present invention applied, Fig. 2 is a section on the line 2—2 of Fig. 1.

Referring now more particularly to the drawing wherein like numerals of reference indicate corresponding parts, the numeral 1 indicates the front axle of a tractor showing the usual pneumatic tired wheel 2, and a portion of the tractor radiator structure at 3.

In tractors of the type with which the present invention is designed to be used, a shaft 4 extends from a power take-off unit located adjacent the transverse center of the machine, upon which a belt pulley 5 is mounted, and when viewing the machine from the front, as illustrated in Fig. 1, this pulley is disposed in the plane between the side of the machine radiator and the wheel 2 and is at such an elevation from the ground that when a belt is passed thereabout and extended forwardly from the tractor, the lower run of the belt will be below the top of the wheel 2 and thus if the apparatus to which the belt extends is not properly alined with the tractor en edge of the belt is apt to come into contact with the wheel and damage the tire thereof or if the wheel is all of steel construction the edge of the belt will be damaged.

The device embodying the present invention comprises a bar which is indicated generally by the numeral 6 and which is formed to provide a central portion 7 which is horizontally disposed when the device is set up for use, and the two spaced parallel and oppositely directed portions 8 and 9 which are vertically disposed. The portion 9 forms the top of the device and is surrounded by a sleeve or roller 10 which is designed to turn about the portion 9 and this roller has a flange 11 at its lower end which bears against the horizontal intermediate portion of the device.

The lower end 8 of the device passes through the vertically alined eyes 12 of a pair of U-bolts, each of which is indicated by the numeral 13. These U-bolts pass transversely above and below the axle 1 and thru the plates 14 which are vertically disposed, as illustrated, with the axle passing therebetween.

The length of the intermediate portion 7 of the device is such that when the securing plates 14 and bolts 13 are attached to the axle 1, the upper portion 9 with the roller 10 will be disposed in a plane lying between the outer end of the pulley 5 and the wheel 2 so that when a belt 15 is passed about the pulley and extends forwardly over the axle 1, the roller will be interposed between it and the wheel 2 and if the tractor and the machine to which the belt leads are not alined properly the roller will prevent the edge of the belt from coming into contact with the wheel or the tire thereon.

It will also be apparent that while the connection between the lower portion 8 of the device and the eyes 12 of the bolts is relatively tight and of a frictional nature, it will permit a slight oscillatory movement of the guide as a whole so that if the guide is not initially set in exactly the correct position the pressure of the belt against the roller will swing it into place.

It will also be readily apparent that by loosening the bolts 13 the clamping plates 14 may be easily and quickly adjusted longitudinally of the axle so that the proper positioning of the device may be made.

I claim:

A belt guide, comprising a pair of plates adapted to have a supporting body gripped therebetween, a pair of eye-bolts extending through said plates and adapted to position above and below said body, a nut threaded upon each bolt and abutting a plate the eyes of the bolts abutting the other plate and being in vertical alinement, and a bar having a central horizontal portion connecting spaced parallel oppositely extending terminal portions, one of said terminal portions being directed downwardly through said alined eyes and the other terminal portion being directed upwardly and adapted to maintain a belt in a desired position.

GUNTHER HARMS.